(12) United States Patent
Zand

(10) Patent No.: US 8,089,344 B1
(45) Date of Patent: Jan. 3, 2012

(54) METHOD AND SYSTEM FOR MINIATURE PASSIVE RFID TAGS AND READERS

(76) Inventor: M Afshin Zand, Pleasanton, CA (US)

( * ) Notice: Subject to any disclaimer, the term of this patent is extended or adjusted under 35 U.S.C. 154(b) by 419 days.

(21) Appl. No.: 11/165,921

(22) Filed: Jun. 25, 2005

Related U.S. Application Data (60) Provisional application No. 60/582,988, filed on Jun. 25, 2004.

(51) Int. Cl.
*H04Q 5/22* (2006.01)
(52) U.S. Cl. .................. 340/10.2; 340/10.34; 455/73
(58) Field of Classification Search .............. 340/10.2, 340/10.34, 10.1, 572.1, 573.1, 539, 572.2, 340/572.4; 455/73, 75, 77
See application file for complete search history.

(56) References Cited

U.S. PATENT DOCUMENTS

| | | | |
|---|---|---|---|
| 5,933,079 A * | 8/1999 | Frink .................... 340/572.4 |
| 6,512,478 B1 * | 1/2003 | Chien .................... 342/357.09 |
| 6,529,166 B2 * | 3/2003 | Kanamaluru .......... 343/700 MS |
| 6,617,962 B1 * | 9/2003 | Horwitz et al. ............. 340/10.4 |
| 7,026,935 B2 * | 4/2006 | Diorio et al. ............... 340/572.2 |
| 7,511,604 B2 * | 3/2009 | Raphaeli et al. ............. 340/10.2 |
| 2002/0154029 A1 * | 10/2002 | Watters et al. ........... 340/870.07 |
| 2002/0198632 A1 * | 12/2002 | Breed et al. ..................... 701/1 |
| 2003/0020597 A1 * | 1/2003 | Goldfinger ................. 340/10.41 |
| 2003/0162498 A1 * | 8/2003 | Rofheart et al. ................ 455/41 |
| 2003/0174048 A1 * | 9/2003 | McCorkle ................. 340/10.34 |
| 2003/0220711 A1 * | 11/2003 | Allen ........................... 700/215 |
| 2005/0054293 A1 * | 3/2005 | Bann ............................ 455/41.3 |
| 2005/0057368 A1 * | 3/2005 | Corbett et al. .......... 340/825.49 |

* cited by examiner

*Primary Examiner* — John A Tweel, Jr.

(57) ABSTRACT

This invention makes possible small size, long range, reliable, low-power, low-cost RFIDs fulfilling the needs of the industry and the roadmap set for RFID, as by Walmart and the DoD. Tag energization and data communication take place by independent means. The invention employs low-power communication means, such as ultra wideband (UWB), for transfer of data between Tag and Reader, and relatively high power narrowband means to remotely energize the Tag. Said means of powering and communication mechanisms, further, are independent of the underlying process, or technology, of implementation of the Microchip on the Tag, as well as from the transceiver technology aboard the Reader. As such, they provide an ideal method and system by which to power and communicate with RFIDs, through cycles of evolution and changes in physical implementation technology.

21 Claims, 5 Drawing Sheets

Communication Between RFID Reader and Tag

Three-digit designations precede component blocks of system

Fig. 1

Energization of RFID Tag by Reader

Three-digit designations precede component blocks of system

101. Microchip
102. Antenna

103. Plan View. RFID Tag consisting of Antenna (102) and Microchip (101), the latter containing UWB transceiver (104)

105. Narrowband energization of Tag by Reader depicted, such as on bands 5.15-5.85 GHz or 2.4-2.4835 GHz or 902-928 MHz (in Europe 869.4-869.65 MHz)

106. RFID Reader containing a directional Antenna (107), narrowband transmitter (108) and UWB transceiver (109)

Fig. 2

Reception and Conversion of RF Energy to Supply Voltage On RFID Tag (schematic representation)

Three-digit designations precede component blocks of system

Fig. 3

Communication Between RFID Reader and Tag

Three-digit designations precede component blocks of system

Fig. 4

Energization of Tag and Communication Between RFID Reader and Tag

Three-digit designations precede component blocks of system

Fig. 5

Localization of an RFID Tag by RFID Readers

Plan view; z-axis is looking into the page

METHOD AND SYSTEM FOR MINIATURE PASSIVE RFID TAGS AND READERS

CROSS REFERENCES

Priority is hereby claimed from Provisional Patent Application No. 60/582,988, Filing or 371 (c) Date: Jun. 25, 2004, Confirmation No. 2760. A copy of PPA is enclosed for reference.

GOVERNMENT CONTRACT/FEDERAL R&D

None. Not Applicable.

FIELD OF THE INVENTION

Field of the invention is that of contactless passive RFIDs. Contactless passive RFIDs are comprised of three basic components: the RFID Microchip, typically being an integrated circuit (IC), hereinafter referred to as "Microchip", RFID antennas to which are attached these Microchips, hereinafter referred to as "Antenna", and RFID readers, also known as interrogators, energizers or scanners, hereinafter referred to as "Reader" or "Reader subsystem". The Microchip and Antenna, attached together, comprise an RFID tag, often also referred to as transponder, or inlay, hereinafter referred to as "Tag". In the industry the Tag alone, for brevity of statement, is in usage often referred to as "RFID". Where the word antenna is not capitalized, hereinafter, it shall not be intended to refer to the Antenna of the RFID Tag, but that of the RFID Reader or to other antenna. Optionally, a battery or other power storage device may be added to the Tag, and in this case the Tags generally are referred to as battery-assisted. The trio of Microchip, Antenna, and Reader is interfaced to the inventory management subsystem of the enterprise software system of an organization via the Reader, through one or more of the wireline or wireless communication ports of the Reader.

BACKGROUND OF THE INVENTION

RFIDs are slated to replace bar codes that have been in use over the past several decades and are widely expected to become ubiquitous over the next ten years. The pace transition from bar code to RFID will be faster particularly as regards newly manufactured items, and the application RFID will extend far beyond the initial sectors of economy where it starts. They are destined be used in a greater number of applications and in greater volume in the future. In time they will become pervasive in the economy of industrialized nations, then developing nations, and then currently partly developed or under-developed nations joining the ranks of the former. Areas of application for RFIDs include the following and encompass most of the economy:

RFIDs contain information about the product to which they are attached, information which in the future will go beyond that presently contained on a bar code. This has typically included an electronic product code, but will in the future include the information that presently stands in the data base of an inventory management system of an organization where the RFID Reader transmits the electronic product code it receives from the Tag, such as manufacturing and transit history, when and where made, product epedigree for traceability of constituents, options, features, etc., price history as during promotions etc.

As they are intended to steadily replace bar code usage, the roadmap set for RFID in the industry, as by the MIT Auto ID Center, its successor organization to EPCglobal, Walmart and other large retailers, as well as the DoD is that of item-level tracking.

Operation of the RFID by means of electromagnetic coupling of energy and then reflection is commonly referred to as a backscatter system. Following the power is coupling, the RFID Microchip comes alive for a brief time during which it is thus able to transfer its information to the Reader. The process may be repeated as necessary. Some RFIDs may be designed as read-only, while others allow both reading and writing. Write-once, read-only RFIDs would have their information recorded at time of manufacture or shortly thereafter and are used in applications where the information regarding the item to be tracked is not expected to be changed. Read-and-write RFIDs can have their information read as well as altered by the Reader. A class of items in this category to serve as an example would be those under warranty, where the name of the buyer (as well as the serial number of the product) could be recorded on the RFID for easy future reference.

Active, or battery-assisted passive, RFIDs are more bulky and expensive, and are used in applications where either the increased cost warrants their use or where the RFID in its passive state is in practice inadequate, as is often the case, but cannot be used in a great number of applications where cost or sheer bulk would prohibit it, such as a great many items on the supermarket shelf.

PRIOR ART

Passive RFIDs have no power source, and are intended as minimal cost items, more or less disposable, for high volume item-level tracking and similar applications. As such the challenge in engineering them is providing energy to the RFID Tag and reliably communicating with it, being the coupling, or transfer, of enough power to the passive RFID to energize it, and allow its Microchip to transmit its information content, typically stored in its digital nonvolatile memory on-board, to the Reader. In order to do so, the RFID Microchip, with millimeter dimensions is connected to and placed upon a sheet containing a flat coil, which sheet also serves as the carrier for the Microchip. This sheet-Antenna and the is Microchip together constitute the RFID Tag. The dimensions of the coil are much larger than the RFID Microchip and the area is typically a few square inches, currently in the RFID industry, or when smaller, the range is so low as to limit its application. This sheet and its Microchip constitute the RFID Tag to be placed on items or products for identification or tracking. The combination of the sheet and the coil constitute one unit and are commonly referred to in the RFID context as "Antenna", whether or not the coupling is electromagnetic waves. The energy is magnetically, capacitively or electromagnetically coupled by a Reader or powering device onto the Antenna and thence to the RFID Microchip. In the longest range RFID systems electromagnetic waves are used, typically in the UHF (specifically around 900 MHz) or microwave (specifically around 2.45 GHz) portion of the spectrum.

Passive RFIDs have no power of their own and being wireless, have to be powered remotely. With current passive RFID technology with the longest range possible, energization and data communication takes place over the same band, typically using carriers in the UHF or microwave region of the frequency spectrum, in particular 902-908 MHz (in Europe 869.4-869.65 MHz) and 2.4-2.4835 GHz. RFID Microchips, comprised typically of integrated circuits, containing stored information in digital form, are attached to a flat sheet on which has been printed a coil Antenna. This Antenna is electrically terminated on the Microchip. Through the Antenna the Microchip is energized by the Reader which, emitting radiation, couples energy to it, enabling it to go from sleep mode to awake mode. To transmit its stored information, then, to the Reader, the Microchip alters the level of energy that it reflects and absorbs, in the field that is directed at it by the Reader. It does so by controlling the termination impedance to of the Antenna. Thus for communicating digital information, consisting of ones and zeroes, the Tag alternately mirrors back the energy directed at it from the Reader, which process is referred to as backscatter. An elegant design for its time, to-day with the demands placed on RFID performance and the wider scope requirements generally in the 21$^{st}$ century, the backscatter system due to a number of shortcomings fails to provide for the industry's needs. These shortcomings are overcome in great measure in the present invention. These shortcomings are encountered in practice and widely known. They are furthermore verified by independent test laboratories such as RFID Alliance Labs and published in the RFID Journal. They include the following.

SUMMARY OF SHORTCOMINGS OF PRIOR ART

Large Tag size—typically 4 inch by 4 inch, thus cannot fit on many small items, or when small have a short range Low range—even with large Tag size, typically under 20 ft and only in ideal conditions, suspended in free space Considerable path loss of signal—The energy has to suffer path loss twice, once from Reader to Tag, and a second time, reflected, from Tag to Reader, each time undergoing this loss in proportion to the inverse square root of the distance in free space Inability to operate reliably without a direct path between Tag and Reader Orientation sensitivity—Tag needs to be properly oriented towards Reader Low reliability and dependability of operation, for example in motion—up to 50% read failure on a warehouse conveyor belt Low mechanical integrity—Large flexible Antenna when bent causes micro cracks in the Microchip mounted on it as widely known in the industry, resulting in 20-40% failures or intermittent operation No radiolocation or ranging ability—Lack of method or system to determine local position of Tags The dimensions of the coil, hence the sheet on which the coil is affixed, are too large to enable item-level tracking. With small Tags, the range is too low for Reader and Tag to operate effectively.

Specific frequencies used in the RFID industry thus far are 110-140 kHz, 4.91 MHz, 13.56 MHz, 800-900 MHz (UHF), 2.45 GHz (microwave). The frequency bands on which RFID systems generally fall into three ranges: low frequency (LF), being 30-300 kHz; high frequency (HF) being 3-30 MHz; ultra high frequency (UHF) being 300 MHz-3 GHz.

OBJECTS AND ADVANTAGES OF THE INVENTION

The classification of RFID systems by the Auto-ID center, and its successor organization EPCglobal is stated below. The RFIDs in this invention are intended to perform almost all these.

| | |
|---|---|
| Class 0 | Read-only; factory-programmable |
| Class 1 | Write-once, read many |
| Class 2 | Fully re-writable |
| Class 3 | Active Tag (fully re-writable) |
| Class 4 | Relay Tag—can communicate with other Tags |

RFIDs in this invention perform the functionality of all five classes, providing a superset of the foregoing, and constitute a new class of RFID.

Further objects and advantages of this invention are reduction in physical size of RFID Tags, thus enabling them to be placed on a great variety of items such as the typical item on a supermarket shelf; greater ease of handling, storage, and application; greater range; ability to operate without a direct path between Tag and Reader; improved reliability and dependability of operation; improved mechanical integrity; capability of localization of the Tag; low power of data transmission, in downlink or uplink, low complexity of hardware; low cost of manufacture.

SUMMARY OF THE INVENTION

A method and system for RFIDs whereby the Tag and Reader, the latter otherwise known as interrogator, scanner or energizer, communicate data by means independent from that used for transfer of energy from Reader to Tag. A narrowband carrier, or continuous wave (CW), with or without data, is used to energize the Tag, while a wideband, low-power signal, typically ultra wideband, is used for the exchange of data between Reader and Tag. The asymmetry established is leveraged to enable the Reader to emit energy to power the Tag at a much higher level than possible using the same band, or low power communications during subsequent data communication with the Tag. The disparity in power levels between these two, narrowband and wideband, is typically a thousand times, most often more. This scheme enables the Reader to is efficiently energize the Tag using any available narrowband frequency, such as those on in the 5.15-5.85 GHz portion of the spectrum, or the 2.4-2.4835 GHz, or the 902-928 MHz (in Europe 869.4-869.65 MHz) where the Reader can output power in the range of Watts. Then Tag and Reader can communicate data in wideband, low-power mode, notably over a portion or over all of the ultra wideband spectrum 3.1-10.6 GHz, where the output power necessary is in the range of well under a milliwatt.

The combination of relatively high power to energize the Tag, and very low power to communicate data to and from the Tag, relieves the Tag from having to communicate by reflection to the Reader, and enables the establishment of a true radio link upstream from Tag to Reader (as well as of course downstream). This radio transmission uplink consists of a signal generated and transmitted by the Tag to the Reader, as opposed to reflections in use in prior art, and enables a greater degree of reliability of the communication link, avoids the double path loss, enables longer range communication between Tag and Reader, uses a smaller Antenna, and hence makes for a smaller Tag.

BRIEF DESCRIPTION OF THE DRAWINGS

FIG. 1 depicts the RF "gun" in the Reader energizing the Microchip on the RFID Tag. This process is one of transfer of energy and takes place in a manner to and on a band different from the process used for data transfer. For this process the Reader contains a narrowband transmitter, but the RFID Microchip needs no receiver as used traditionally in communications. Instead, the narrowband transmission energy is received by the Microchip and directly routed to a power supply circuit which takes the waveform, rectifies and shapes it, and turns it into a DC voltage level for the brief duration of processing on the RFID Microchip and communication between the Reader and Tag.

FIG. 2 schematically depicts the Antenna and power supply circuit, the latter being part of the RFID Microchip. The waveform from the Reader arrives via the Antenna, the latter depicted as a pair of solid lines for simplicity. Chief among the various antennas in this invention is a patch Antenna. The converter is used to perform a regulatory function and to step up or step down the voltage to a level appropriate, such as 1.8 volts, for the circuitry inside the integrated circuit constituting the Microchip to operate. One embodiment of the converter is illustrated by the optional zener diode. It acts as a single-component, inexpensive step-down converter and regulator for applications where the requirement on the efficiency of power conversion is more relaxed, these being primarily low-range applications.

DETAILED DESCRIPTION OF THE INVENTION

The Reader powers the Tag by transmission of a relatively high power narrowband carrier frequency, but communicates to/from the Tag by comparatively low power means over a wideband portion of the frequency spectrum. The energization of the Microchip on the Tag takes place by a different mechanism and uses a different method than is used for communication to between Reader and Tag.

Reader and Tag communicate data by means of ultra wideband transmission and reception on a portion or all of the 3.1-10.6 GHz band. The total power for transmission by this means, in either direction, but in particular from Tag to Reader, is well under a milliwatt. The Antenna for operation at this power is a small patch antenna. The size of the patch Antenna has already been demonstrated with antennas of approximately 19 mm by 25 mm in size, 17 mm by 20 mm in size, 8 mm by 10 mm in size, and 6 mm by 8 mm in size. The low power consumption of the Microchip means that the energy capture and storage devices on board are of small size and low-power. The size affects the silicon area, thus physical area, and cost of the integrated circuit constituting the Microchip.

For the purposes of this invention what is intended by a narrowband carrier is a continuous or hopping wave with or without modulated data with a maximum bandwidth of 150 MHz, and what is intended by a wideband signal is one which has a bandwidth of at least 250 MHz, and what is intended by an ultra wideband signal, at least as initial practice, is one which has a bandwidth of at least 500 MHz.

Were the power needed by the Tag to be transferred remotely by the Reader to Tag by the same wideband means as data is communicated, said power would suffer such path loss as to render it wholly insufficient for the purpose of energizing the Microchip when it arrives at the Antenna. The gain of the directional Antenna incorporated in the Reader to effectively boosts its output power for the Tag to higher levels. The transfer of energy takes place on a suitable available narrowband. As a first implementation this invention will use carriers in the 5.15-5.85 GHz band, in the 2.4 GHz band, or in the 900 MHz (in Europe 869.4-869.65 MHz) band. The Reader thus couples well over a thousand times more energy to the Tag using this method than the energy utilized by the Tag for communication to the Reader. The narrowband carrier is used for energization of the Tags, while communication between Tag and Reader takes place by means of ultra wideband. The power emanated from the Reader is sufficient for RFID read or write operations involving the Tag with no energy is storage necessary. Sample link budgets yield sufficient power at a range of over 50 feet to energize the Tag to communicate uplink and receive and process communication downlink from the Reader.

An inductive power conversion circuit or a capacitive charge pump using low forward voltage drop schottky diodes is used to convert the power thus received by the Tag from the Reader to a useful supply voltage for the Microchip's internal circuitry, typically in the range 1.2-1.8 Volts.

Optionally for some applications, when higher transmission power, such as for the purposes of extending the range even further are desirable, than the power level available in real time to the Tag, a capacitor is incorporated onto the Tag. Thus prior to communication, for a brief period the Microchip on the Tag first absorbs and stores energy aboard the capacitor from the Reader. Then, during communication, the Microchip uses a greater amount of power than would be available to it continuously in real-time mode from the Reader energizing it. The size of the capacitor used is described below:

The energy stored aboard a capacitor being $E = \frac{1}{2} CV^2$, gives us the capacitance needed, C, as being equal to $2 E/V^2$. Power equals average energy spent per unit time, and thus the energy needed to be stored equals this average power multiplied by time. For the Microchip to operate at a steady level of 2 microwatts over the typical period of about 8 milliseconds necessary to establish communications and transmit its contents to the Reader, the energy needed would be estimates as:

$$2 \ \mu W \times 8 \ ms = 16 \text{ nanojoules.}$$

Thus the value of the capacitor, for circuit operation at 1.8 V (a current widely used supply voltage in ICs), allowing for a drop of one volt from the unregulated voltage to the supply output, for a total of 2.8V, is as follows:

$$C = 2E/V^2 = 2 \times (16 \ nJ) \times (2.8 \ V)^2 = 250.88 \ nF \approx 0.25 \ \mu F$$

Such values of capacitance is available in the industry-standard small form-factor "1206" packages, measuring 1 mm by 3.5 mm, as a commodity item at very low estimated additional cost to the Tag, as of this writing a fraction of a cent, with handling and assembly added together all still below half a cent. Capacitors at many times the 0.25 microfarad value are also available at approximately the same cost and in the same or similarly small package which may be used preferably. Thus a capacitor may optionally be integrated on-board the Tag, as may be desirable in the future, to enable operation at a higher power level, to extend the period of operation in large memory applications, to extend range for example for radiolocation purposes, to increase available processing power for example for coding/encoding, or to enhance other capabilities of the Tag.

In addition, optionally, to further extend operational range such as for radiolocation purposes, beyond where the Reader could reach to power the Tag, a solar cell, a battery, or a much larger storage capacitor, of the order of Farads, may be incorporated onto the Tag. The solar cell would be used in combination with either a capacitor or a battery when night operation is required. The added cost, as of this writing, will be in the 50 cent range and comparable to battery-assisted Tags.

In an application where line of sight is available, optionally, the Reader will emit a beam of electromagnetic radiation, such as in the infrared or visible bands, to power the Tag.

The process of capture and conversion of this energy into a useful supply for the operation of the circuitry on the Microchip, is taken conservatively as 50% efficient (consider for comparison the 80-95% typical efficiency of commodity power converters in the electronics industry readily available from manufacturers).

The power necessary to operate the circuitry aboard an RFID Tag is less than a few microwatts. As an example, in 2001 RFIDs implemented in an inexpensive 0.5 micron CMOS process required 5 microwatts for operation.

For locating the position of a Tag the following method is employed. The system comprised of the RFID Tag and the RFID Reader or Readers, by means of communication of a known test signal from Reader to Tag and back, performs measurement of time of flight, allows for a known processing delay till response issues from Tag. It then determines the distance between Reader and Tag by subtraction of the processing delay from half the round-trip time of flight and multiplication of the result by the speed of light. It then calculates, employing proper algorithms involving the solving of simultaneous equations resultant from the intersection of circles or spheres centered at each Reader whose radius is the distance thus measured, and locates the two dimensional or three-dimensional position of an RFID Tag.

The asymmetric means of energization and communication makes possible a Microchip on the Tag with relatively low power usage as compared to the power transmitted by the Reader. This asymmetric scheme, combined narrowband energization and wideband communication, and its implementation, achieves this invention's major advantages over existing RFID systems, namely:

1) Longer range. Due to the establishment of an uplink from Tag to Reader employing a signal generated by the Tag, and hence lower path loss, combined with an efficient method of remotely powering the Tag and other techniques, the possible range of operation from Reader to Tag is substantially increased as compared to prior art.
2) Much smaller Antenna size. As shown above, being not more than 26 mm by 19 mm, thus giving a smaller Tag than prior art. The smaller Tag results in wider applicability and greater ease of handling, storing and application to objects.
3) Flexibility in Orientation. Orientation of Tag to Reader is not required, nor a direct path from Tag to Reader, The ultra wideband signal of communicating data between Reader and Tag in this invention, allows and benefits from reflections in the path from Tag to Reader and vice versa. Thus, firstly, orientation of the Tag toward the Reader is not necessary and, secondly, a direct path between Tag and Reader is not required. The Tag and Reader can thus operate in cluttered environments, though when in such environments the range will accordingly to the number and kind of objects in between be reduced compared to free space.
4) Reliability and dependability. Due to the establishment of a true radio link from Tag to Reader, with a signal of energy originated by the Tag and transmitted to the Reader, a reliable and dependable a form of wireless communication, is achieved comparable to any other, such as wireless LAN or mobile telephone, both of which likewise possess a true uplink rather than use reflections.
5) Mechanical Integrity. Due to the rigid patch Antenna employed for communication unlike prior art which uses a large flexible sheet, the Microchip on the Antenna, being typically a integrated circuit, does not bend to result in micro cracks or breakage.

Figure 4:
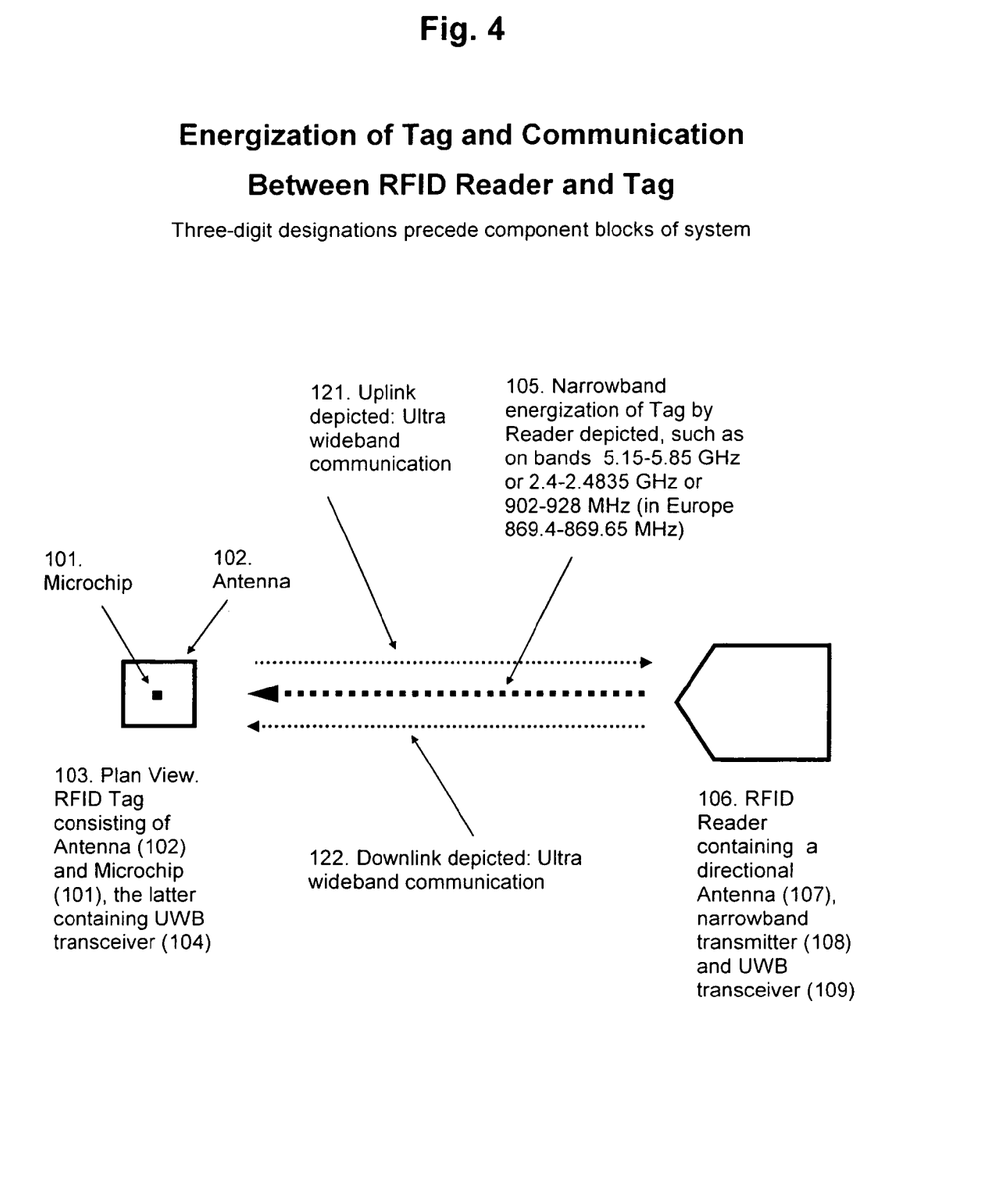
FIG. 4 depicts simultaneous energization and exchange of information between the Reader and Tag.

In an embodiment, as depicted in FIG. 4, an RFID Reader 106 equipped with a directional antenna 107 with gain, a narrowband transmitter 108, and an ultra wideband (UWB) transceiver 109, transmits a narrowband carrier 105 to energize an RFID Tag 103. The RFID Tag's Antenna 102 which may have negative or to positive gain, receives energy from this transmission, and transfers said energy to the Tag's Microchip 101. The Tag's Microchip 101 thus enters awake mode from asleep, establishes communication 121 with and transmits via its UWB transceiver 104 the contents of its memory to the Reader 106. The reader receives this information from the Tag 103, and optionally updates the contents of the Tag's Microchip's memory by establishing communication 122 with and transmitting a 500 MHz wide ultra wideband signal overlapping the narrowband frequency to the Tag.

Figure 5:
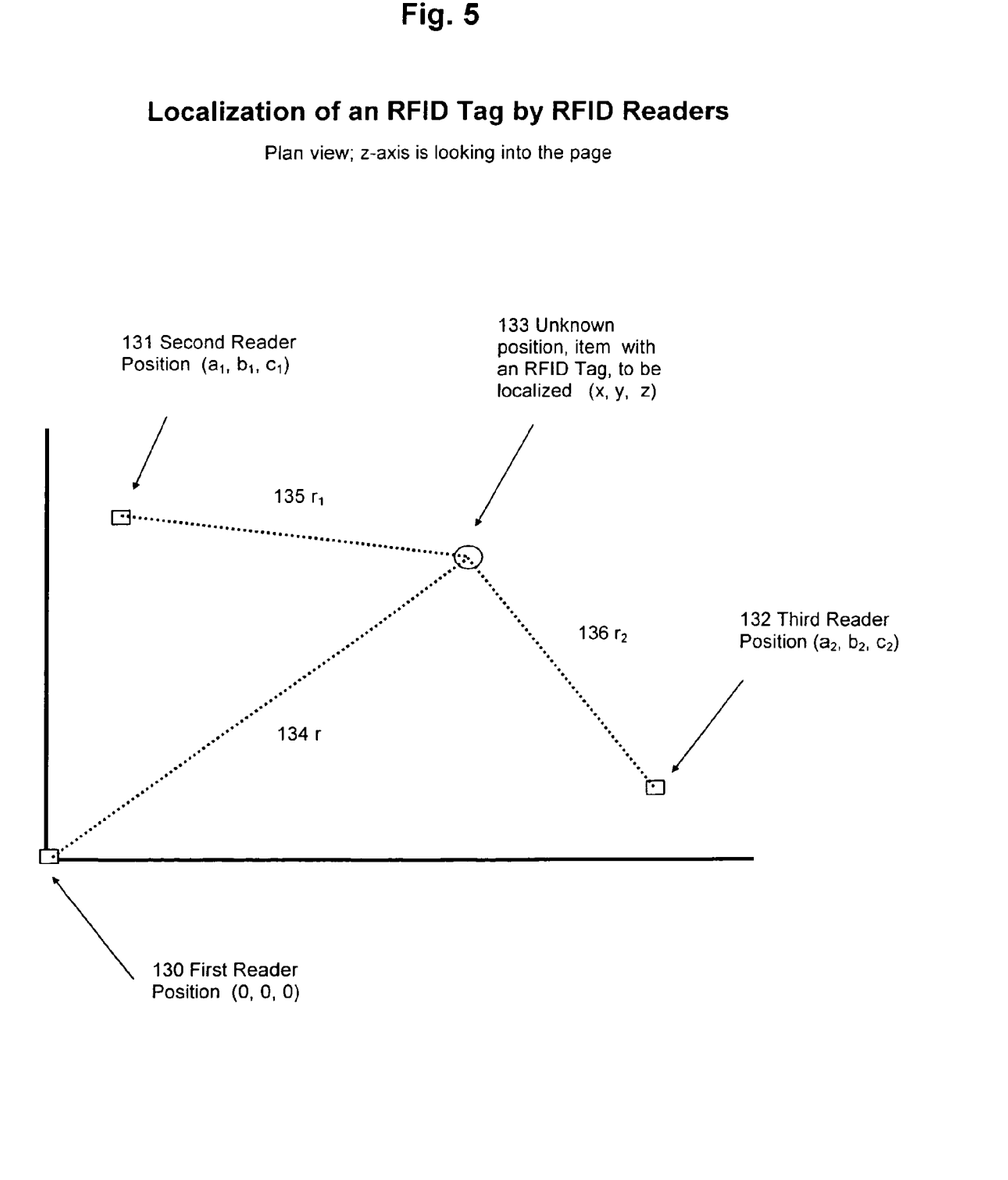
FIG. 5 depicts three-dimensional localization of an item, of unknown position, which has an RFID Tag, by three Readers. A plan view, the z-axis is looking into the page.

In an embodiment as depicted in FIG. 5, a test signal known to the Tag 133 is sent to the Tag by one of several Readers 130. The Tag, upon recognizing said signal, issues an acknowledgment known to the Reader 130, which measures the round-trip time. The response time, or processing delay, of the Tag is known by calculation or measurement and has been pre-recorded in the Reader 130 at time of manufacture. The Reader then subtracts this processing delay from the round-trip time for its reply, divides the result obtained by two, multiplies this result by the speed of light, and obtains the distance 134 from it to the Tag 133. For a three-dimensional localization of the Tag, the procedure is repeated by at least two more Readers 131 and 132, and their distances 135 and 136, respectively, from the Tag similarly measured, but where a two-dimensional localization of the Tag may suffice, the procedure is repeated by at least one more Reader. The distance of each Reader from the Tag is thus determined, which distance is the radius of a circle centered at the respective Reader. Thus, in a Cartesian coordinate system (x, y, z), with the location of the first Reader 130 regarded as the origin, the location of the second Reader 131 as $(a_1, b_1, c_1)$, and that of the third Reader 132 as $(a_2, b_2, c_2)$, and their radii respectively $r, r_1, r_2$, for a three-dimensional localization three equations are obtained:

$$x^2+y^2+z^2=r^2$$

$$(x-a_1)^2+(y-b_1)^2+(z-c_1)^2=r_1^2$$

$$(x-a_2)^2+(y-b_2)^2+(z-c_2)^2=r_2^2$$

thus giving three simultaneous equations, sufficient to solve for the values of x, y, z, which lie at the intersection of the three spheres thus obtained, and define the location of the Tag 133. As these are quadratic equations a pair of values may be obtained for each unknown, and one of them would lie outside the range of practice. As an alternative means to recognizing which lies outside said range, an additional Reader may be used, whereby four simultaneous equations would be available for the solution of three unknowns.

Where only a two-dimensional positioning is required, a minimum of two Readers would be used, with the equations then being:

$$x^2+y^2=r^2$$

$$(x-a_1)^2+(y-b_1)^2=r_1^2$$

Again as these are quadratic equations a pair of values may be obtained for each unknown, and one of them would lie outside the range of practice. As an alternative means to recognizing which lies outside said range, an additional Reader may be used, whereby three simultaneous equations would be available for the solution of two unknowns.

Figure 1:
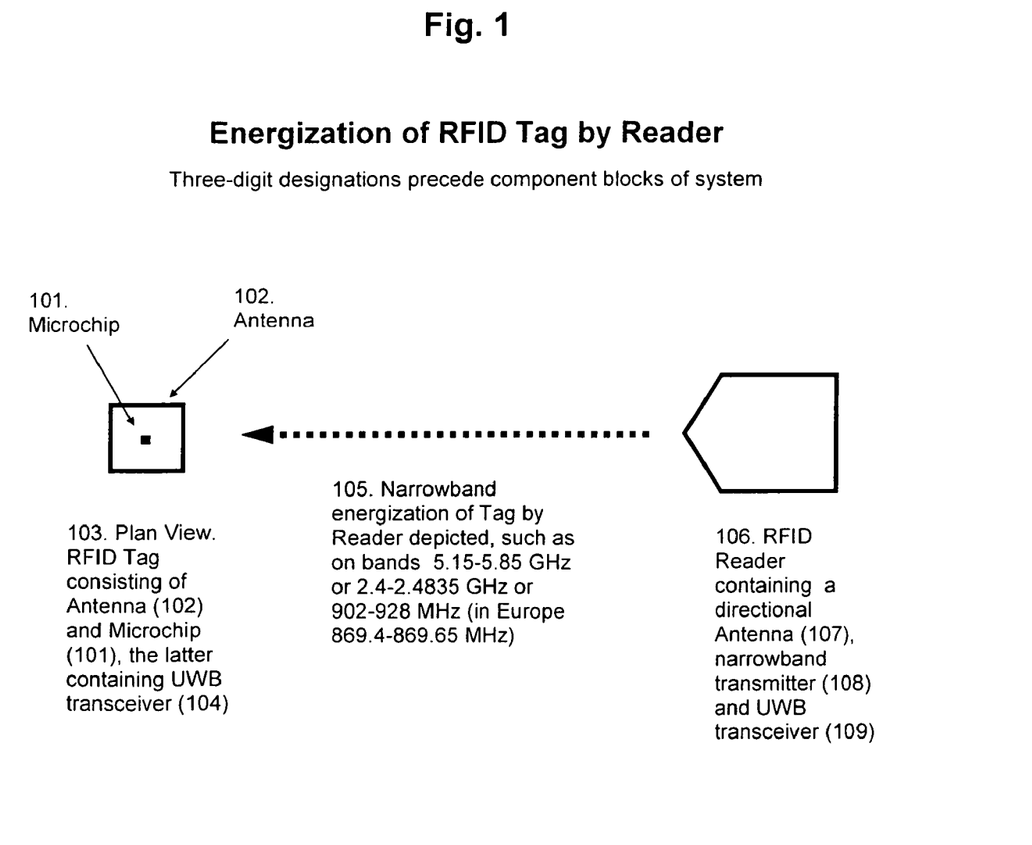
Figure 2:
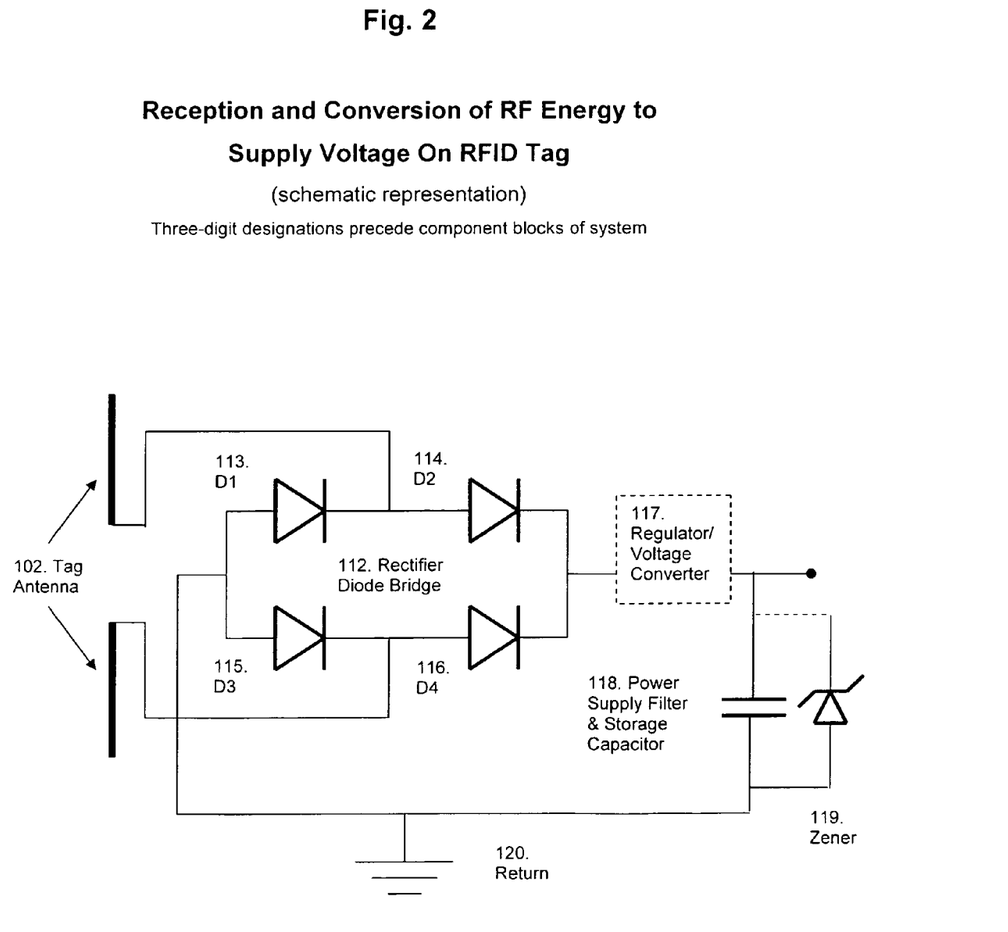
Figure 3:
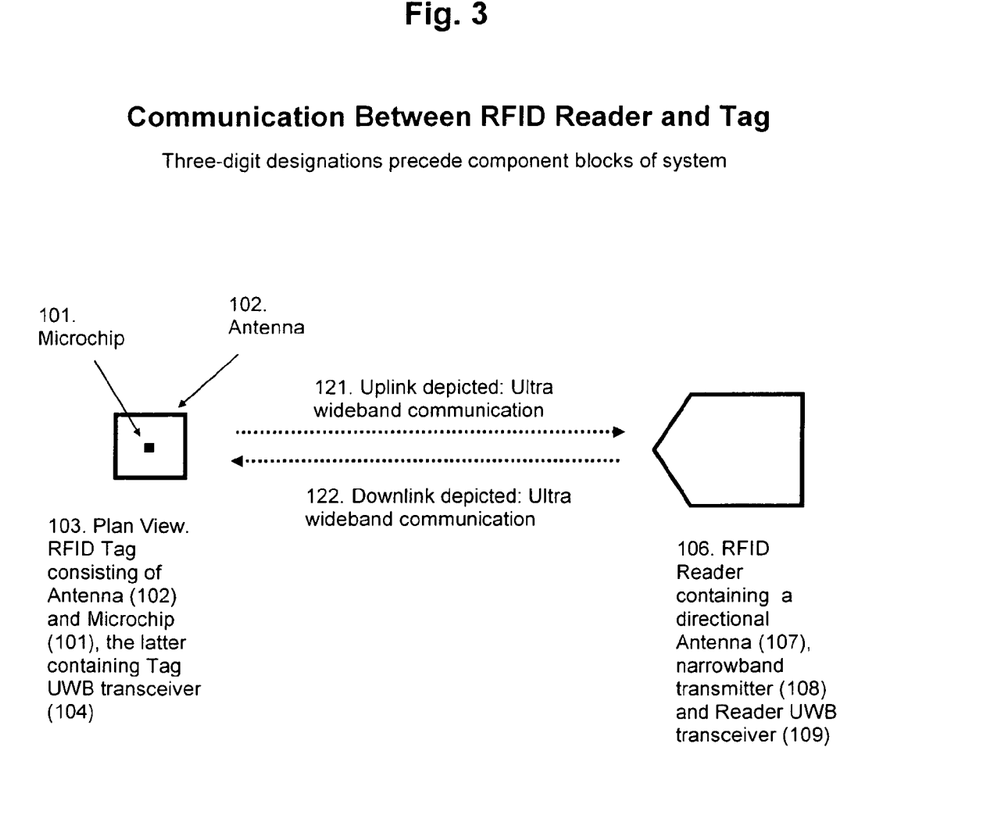
FIG. 3 depicts the Reader and the Tag exchanging information by a low-power wideband method, different from that by which the Reader energizes the Microchip on the Tag. Typically this method is ultra wideband, and the RFID Microchip and Reader each contain a UWB transceiver and communicate by means of ultra wideband transmission and reception.

In an embodiment, as depicted in FIG. 2, an RF waveform from an RFID Reader arrives at the Antenna 102 of an RFID Tag. The waveform causes the flow of electrical energy from the Antenna 102 to the diodes 113-116 which rectify the electrical waveform and pass it to a power converter 117 which thereby converts the received waveform to a higher or lower voltage usable by the Tag's apparatus. A capacitor 118 further smoothes the voltage output by converter 117. In cases the usual voltage output by the diodes 113-116 is usable without conversion to a significantly higher or lower voltage, for the operational voltage needed a zener 119 is selected, and the zener in conjunction with the capacitor 118 performs the task of providing a stable supply at desired voltage.

What is claimed is:

1. A method for Radio Frequency Identification (RFID), whereby an RFID Reader remotely energizes a Tag or plurality of Tags by means of a carrier-based signal which may be stationary or hopping and need carry no data, and wherein the means of transmission and reception by which the Tag or a plurality of Tags and the Reader or Readers communicate information is that of an ultra wideband signal only, wherein the ultra wideband signal is pulsed and carrierless, and occupying a minimum bandwidth ranging from tens of Megahertz to five hundred Megahertz, to a maximum bandwidth of several Gigahertz or more, whereby the communication may include reception by a rake receiver in the reader, and wherein the Tag comprises a patch Antenna, and an integrated circuit containing circuitry and means for information processing.

2. The method of claim 1, wherein a narrowband stationary or hopping carrier in the 5.15-5.85 GHz frequency range, or the 2.4-2.4835 GHz range, or the 902-928 MHz range, or the 869.4-869.65 MHz range, or other available frequency range, which need carry no data, is transmitted by the Reader thus energizing the Tag or Tags.

3. The method of claim 1, whereby the carrier-based signal's frequency overlaps the ultra wideband signal's frequency spectrum or is near that frequency spectrum, thus allowing the Tag to be operational with a single Antenna capable of receiving both the carrier-based stationary or hopping signal and receiving and/or transmitting the ultra wideband signal.

4. The method of claim 1, whereby the Reader employs one or more directional antennae, also known as constant aperture antenna, which intrinsically have gain and may serve one or both of said signals, whereby in the case of the carrier-based signal the power output of the carrier from a Reader may be lowered in proper proportion according to the gain of said directional antenna.

5. The method of claim 1, whereby the physical mechanism by which the RFID Reader performs its function of energization of the RFID Tag resides in a housing or enclosure distinct from and located separately from the physical mechanism by which the RFID Reader communicates information with the RFID Tag or plurality of Tags, thus enabling the placement of multiple energizers strategically where Tags are to be powered and read from or written to.

6. The method of claim 1, whereby the integrated circuit of the Tag employs low forward voltage-drop diodes, or equivalent components, including, but not limited to, Schottky diodes, and/or employs a capacitive charge pump or inductive switching circuit to convert received power from a Reader or energizer to a power supply with useful voltage for its circuitry and the integrated circuit of the Tag employs a zener diode or diodes or equivalent means to regulate and stabilize said voltage for use by the rest of the Tag's integrated circuit.

7. The method of claim 1, whereby the integrated circuit of the Tag employs memory, electrically-erasable programmable read-only memory or non-volatile random access memory, to record information it may receive from the Reader or Readers, or to store information at the time of manufacture, and thus be able to retain such information in the absence of power.

8. The method of claim 1, whereby the Reader, receiving ultra wideband information from the Tags, through its ports operates wireless or wireline communication links to other equipment, where said equipment constitutes part of the enterprise system of an organization which may include a factory, warehouse, department store, retail outlet, or offices, for the purpose of relaying information aboard Tag(s) to said system, and communicating between said system and the Tag, wherein said ports and links are separate and distinct from the links between Reader and Tag.

9. The method of claim 1, whereby the RFID Tag employs within its integrated circuit one or more integrated components having radio frequency, analog and digital circuitry and means for processing information, said circuitry and other means comprising the RFID Tag's integrated circuit.

10. The method of claim 1, whereby the RFID Tag employs within its integrated circuit, for the purposes of processing data: memory, logic control, state machine, microcoded engine, microcontroller, central processing unit, digital signal processor.

11. The method of claim 1, wherein the means by which the RFID Tag is, or a plurality of RFID Tags are, energized is augmented or replaced by a solar cell incorporated on the integrated circuit of the RFID Tag or is augmented or replaced by a battery incorporated on the integrated circuit of the RFID Tag.

12. The method of claim 1, wherein the means by which the RFID Tag is, or a plurality of RFID Tags are, energized, where a line of sight is available, is augmented or replaced by a beam of electromagnetic radiation in the infra-red or visible or other available and permissible part of the spectrum.

13. The method of claim 1, wherein the means by which the RFID Tag is, or a plurality of RFID Tags are, energized is augmented by the integrated circuit aboard the RFID Tag incorporating a capacitor for the storage of energy received, for use by the rest of the integrated circuit aboard Tag or for transmission after energization has ceased.

14. The method of claim 1, wherein the system comprised of the RFID Tag or plurality of Tags and the RFID Reader or Readers, by means of communication of a known test signal from Reader to Tag and back, performs measurement of time of flight, allows for a known processing delay until response issues from Tag, determines distance between Reader and Tag by subtraction of said processing delay from half the round-trip time of flight, and multiplication of the result by the speed of light, and by calculation employing proper algorithms involving the solving of simultaneous equations locates the two-dimensional or three-dimensional position of an RFID Tag or Tags desired to be localized, which emitted said test signal.

15. The method of claim 1, wherein the system comprised of the RFID Tag or plurality of Tags and the RFID Reader or Readers, by means of communication of a known test signal from Tag which is then received by Readers, calculates the time difference of arrival of said signal at various Readers and from that information, and speed of light, and by calculation employing proper algorithms involving the solving of simultaneous equations thus locates the two dimensional or three-dimensional position of the RFID Tag or Tags desired to be localized, which emitted said test signal.

16. The method of claim 1, wherein a plurality of RFID Tags communicate information to each other and act as relays for one another and communicate information in a mesh network, thus enabling the networking of Tags in the absence of Readers as well as extending the range possible between a given RFID Reader and a given RFID Tag.

17. The method of claim 11, wherein a plurality of Tags thus energized communicate information to each other and act as relays for one another in a mesh network, thus enabling the networking of Tags in the absence of Readers as well as extending the range possible between a given RFID Reader and a given RFID Tag.

18. The method of claim 12, wherein a plurality of RFID Tags thus energized communicate information to each other and act as relays for one another in a mesh network, thus enabling the networking of Tags in the absence of Readers as well as extending the range possible between a given RFID Reader and a given RFID Tag.

19. The method of claim 13, wherein a plurality of RFID Tags thus energized communicate information to each other and act as relays for one another in a mesh network, thus enabling the networking of Tags in the absence of Readers as well as extending the range possible between a given RFID Reader and a given RFID Tag.

20. The method of claim 10, wherein a plurality of RFID Tags thus energized are able to communicate information to is each other and act as relays for one another in a mesh network, thus enabling the networking of Tags in the absence of Readers as well as extending the range possible between a given RFID Reader and a given RFID Tag.

21. The method of claim 1, wherein possible collisions in transmission to the Reader or Readers from a plurality of RFID Tags that may be energized simultaneously is prevented or minimized by an anti-collision algorithm or protocol with statistical randomized timing of transmissions precoded into the integrated circuit of the Tags and into the Reader for expecting the same, or wherein the RFID reader is able to selectively address or turn off, temporarily or permanently, individual Tags.

* * * * *